Nov. 15, 1955
C. CONOVER
2,723,688
FOUR-MOTION RECIPROCATING POWER DRIVEN SAW ATTACHMENT
Filed April 29, 1952
3 Sheets-Sheet 1
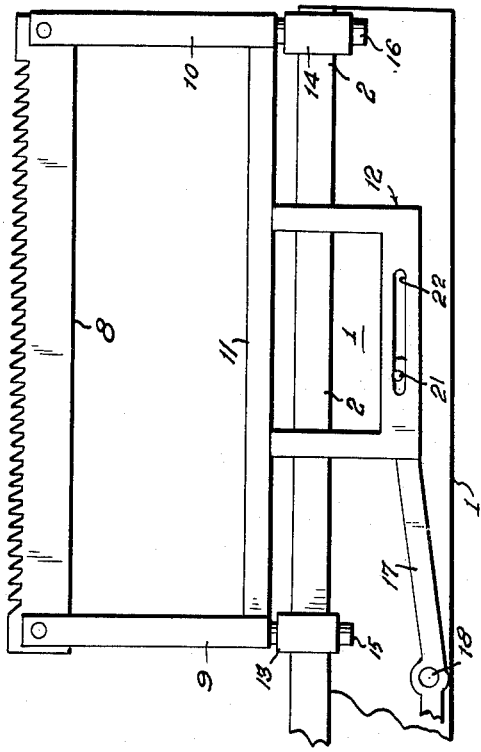
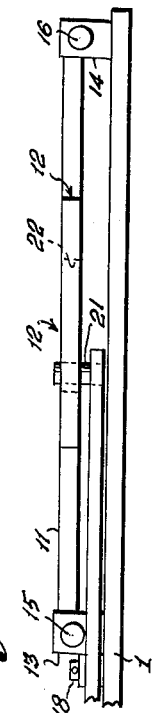
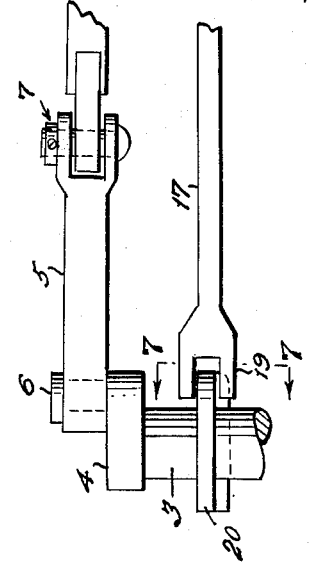
INVENTOR.
Courtney Conover
BY
Henry C. Parker
Attorney.

Nov. 15, 1955     C. CONOVER     2,723,688
FOUR-MOTION RECIPROCATING POWER DRIVEN SAW ATTACHMENT
Filed April 29, 1952     3 Sheets-Sheet 2
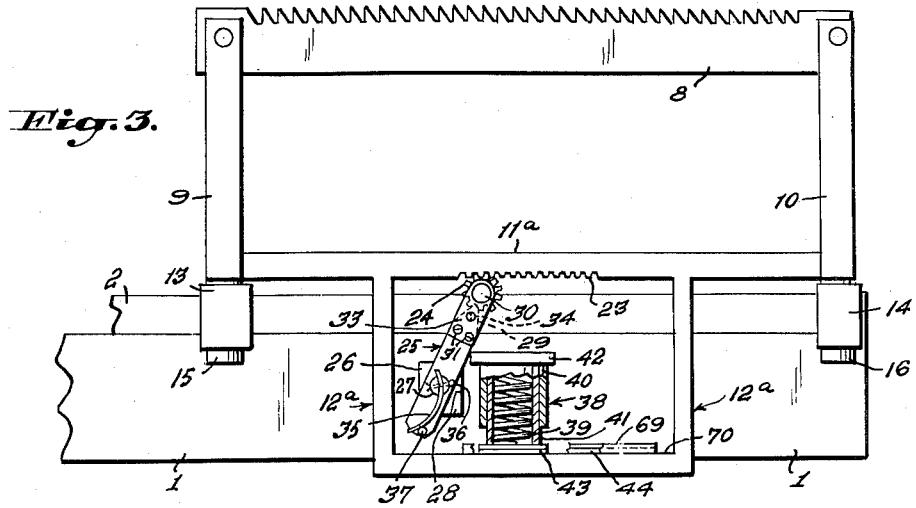
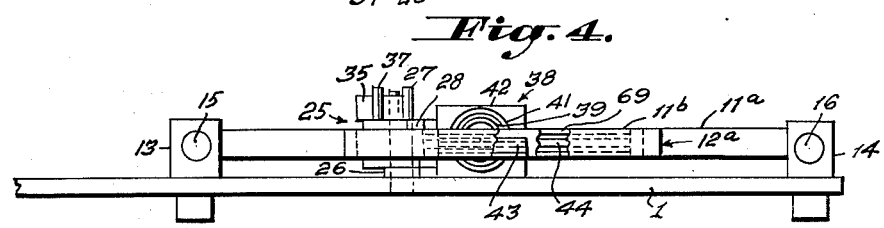
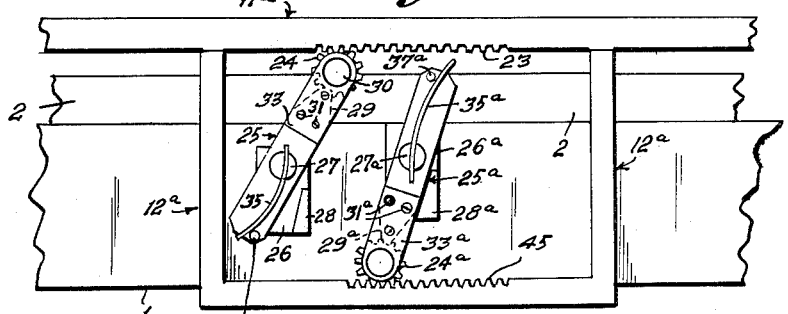
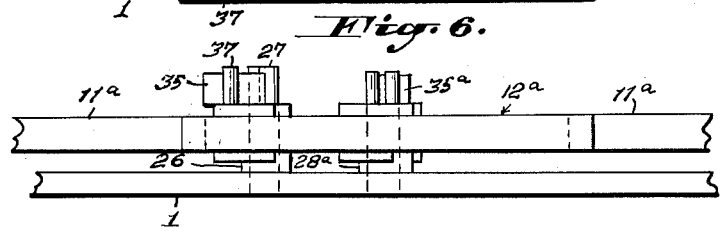
INVENTOR.
Courtney Conover
BY
Henry C. Parker
Attorney.

Nov. 15, 1955  C. CONOVER  2,723,688
FOUR-MOTION RECIPROCATING POWER DRIVEN SAW ATTACHMENT
Filed April 29, 1952
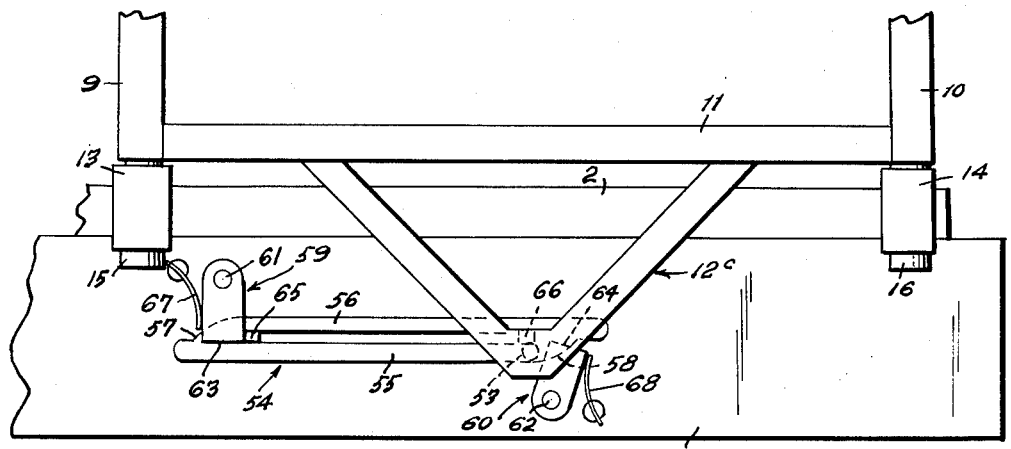
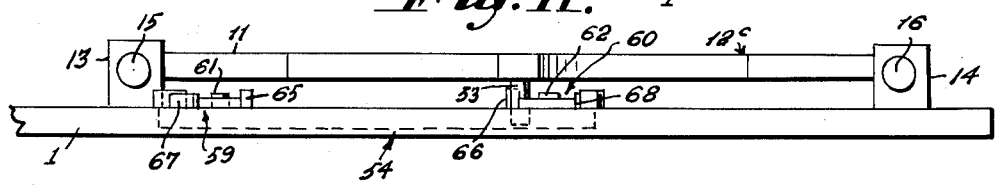
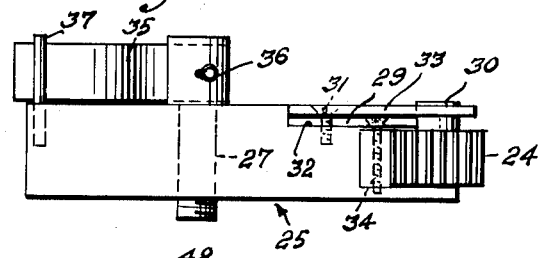
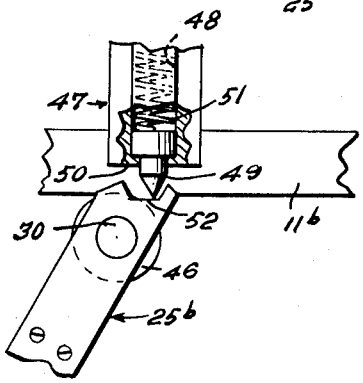
INVENTOR.
Courtney Conover
BY
Henry C. Parker
Attorney.

United States Patent Office 2,723,688
Patented Nov. 15, 1955

2,723,688

FOUR-MOTION RECIPROCATING POWER DRIVEN SAW ATTACHMENT

Courtney Conover, Silver Spring, Md.

Application April 29, 1952, Serial No. 285,000

6 Claims. (Cl. 143—63)

This invention relates to power driven saw attachments; and it comprises a saw attachment adapted to be connected to a rotary source of power, such as the rotary power shaft of a mowing machine or the like, said attachment comprising a stationary base plate which may be the plate which supports and guides the cutter bar of the mowing machine, a sliding bar having a longitudinal reciprocating stroke mounted for reciprocating motion on said base plate, means for converting the rotary motion of said power shaft to reciprocating motion, said means being operatively attached to said sliding bar to produce longitudinal reciprocation thereof, spaced-parallel slide bearings mounted transversely on said sliding bar, a saw frame including a saw blade mounted in said bearings with the saw blade at one side of but substantially parallel with said sliding bar, means mounted on said base plate and operative at one end of the reciprocating stroke of the sliding bar to move the saw and its frame into sawing position away from the base plate, said means comprising a lever pivotally mounted on said base plate, a rotary element rotatably mounted at one end of said lever and bearing against a cooperating section of the saw frame in such manner that, when the lever is pivoted into a first position substantially perpendicular to the longitudinal axis of the saw frame, the saw and its frame are forced by pressure of the rotary element against the cooperating section of the saw frame to move in said slide bearings in a transverse direction and into sawing position, and that when said lever is pivoted into a second position at an angle to said longitudinal axis the saw and its frame are free to move into idling position, means for causing said lever to move into said sawing position at the start of the sawing stroke of the saw frame and for holding it in said position during the sawing stroke, means for causing said lever to move into said idling position and for holding it in said position during the idling stroke of the saw and means for causing the saw and its frame to move into and be held in idling position during the idling stroke of the saw; all as more fully hereinafter set forth and as claimed.

An object of the present invention is to supply a reciprocating saw attachment for power driven mowing machines and the like which are provided with rotary power shafts.

Another object is to provide a saw attachment which can be readily mounted on a power driven machine and connected to its rotary power shaft.

A further object is to provide a saw attachment in which a wood saw reciprocates with a power stroke in one direction followed by an idling stroke in the opposite direction and in which the saw is pulled and held away from the work until the beginning of the power stroke at which time it is pressed against the work and held in this position until the end of the power stroke.

Still another object is to provide a saw attachment which can be used, when attached to a power driven machine, quickly to cut brush, scrub and small trees from land which requires clearing.

Reciprocating saws, in comparison with circular saws and chain saws capable of doing the same work, are generally safer to use, lighter in weight, more easily replaced when dulled, more economical in power and more easily kept in good working condition. Further a reciprocating saw is somewhat less likely to be damaged when used under adverse working conditions. In the past, most power driven reciprocating saws have operated with long strokes and have been designed to cut in both directions of their reciprocating motions. This has resulted in considerable difficulties from binding since the saw dust tends to become trapped between the saw and the cut when saws are operated in this manner.

I have found that these difficulties can be eliminated by the use of a saw which cuts in one direction only and is pulled away from the work on its return stroke. This manner of operation causes the saw dust to be discharged from the cut promptly and from one side of the cut only. The saw dust is not pushed backward and forward in the middle of the cut as in the conventional two-way saws, but is intermittently moved in the direction of the cutting stroke. Another advantage obtained in employing a saw with an operating and an idling stroke is that the saw teeth can be shaped for cutting wood in one direction only and hence can be formed for maximum efficiency of cutting.

I have also found that an efficient reciprocating saw of the type described can be made as a convenient attachment for the conventional mowing machine. In its less expensive form this saw attachment is designed to operate with a short stroke of which the length is a small fraction of the length of the saw and hence a small fraction of the possible width of cut. When constructed in this fashion it is possible to make use of the reciprocating mechanism which drives the cutter bar of the conventional mowing machine. It is also possible with but little added expense to supply with the saw attachment a reciprocating mechanism having a stroke of substantially any desired length which mechanism can be attached to any machine provided with a rotary power shaft.

The attachment has been found particularly well adapted for use in sawing applications wherein the saw is operated at a relatively great distance from the automotive carrier and the source of power. It is particularly adapted for use in the cutting of bushes and trees which branch out close to the ground and for cutting bushes and trees on the bank of a highway where they may be at a higher or lower level than the road bed or on a slope.

My invention can be explained in greater detail by reference to the accompanying drawing which shows, more or less diagrammatically, several operative embodiments of my saw attachment. In this showing Fig. 1 is a plan view of a saw attachment which makes use of a cam and lever attachment to operate the saw frame from the rotary power shaft of a mowing machine, for example, Fig. 2 is a side view of the attachment shown in Fig. 1 taken from the bottom of Fig. 1, Fig. 3 is a plan view of a modification in which the saw frame is reciprocated transversely with the aid of a lever and a spring, Fig. 4 is a side view of the modification of Fig. 3 taken from the bottom of the latter figure, Fig. 5 is a plan view of another modification in which the saw frame is reciprocated transversely with the aid of two levers, Fig. 6 is a side view of the modification of Fig. 5 taken from the bottom of the latter figure, Fig. 7 is a front or edgewise view of the cam employed to reciprocate the saw frame of Figs. 1 and 2, taken along the line 7—7 of Fig. 1, Fig. 8 is a side view of the lever used to produce reciprocation of the saw frame of Figs. 3 to 6.

Fig. 9 is a plan view of a lever modification which can be employed to reciprocate the saw frame, Fig. 10 is a plan view of still another modification of my saw attachment in which transverse reciprocation of the saw frame is accomplished by means of a cam track and pin operating therein, while Fig. 11 is a side view of the modification of Fig. 10 taken from the bottom of the latter figure.

In the various views like parts are designated by the same reference numerals. Referring first to Figs. 1 and 2, reference numeral 1 designates a steel base plate, such as is used as the main supporting base for the cutter bar of the conventional mowing machine in which mowing is effected by means of reciprocating knives, while 2 designates a sliding bar which replaces the conventional sliding cutter bar and which slides in conventional supports and guides not shown in the drawing. Power is furnished to the sliding bar from the main rotary power shaft 3 of the mowing or other machine through the crank 4, crank arm 5, crank pin 6 and coupling shown generally at 7, this producing a longitudinal reciprocating motion of the sliding bar. The saw blade 8 is attached at its ends to the outer ends of two arms 9 and 10 which are connected at their inner ends by a cross arm 11. An off-set three sided frame shown generally at 12 is rigidly attached to the inner side of the cross arm. Thus the saw 8, the arms 9 and 10, the cross arm 11 and the side frame 12 form together a rigid frame for supporting and guiding the saw. This saw frame is slidably mounted on the reciprocating bar 2 by means of transversely mounted slide bearings 13 and 14 in which the shafts 15 and 16 are journaled, the latter forming continuations of the arms 9 and 10. Thus the saw frame is mounted for longitudinal reciprocation with the bar 2 as well as for transverse reciprocation during which the saw is moved into operating position away from its base during its power stroke and then into inoperative position upon the return stroke.

The means provided in Figs. 1 and 2 for causing the transverse reciprocating motion of the saw frame comprises the lever arm 17 which is pivoted to the base 1 at 18. At its inner end this lever is provided with a bifurcated cam follower 19 which cooperates with cylindrical cam 20 mounted on the power shaft 3. This cam is formed in two sections which are offset from each other, as shown in Fig. 7, and which cause the lever 17 to oscillate back and forth in a horizontal plane about the pivot 18. The opposite end of the lever is provided with a pin 21 which engages a longitudinal slot 22 provided in side frame 12.

The cam 20 as shown in Fig. 7 is formed in such fashion that at the start of the power stroke of the saw, which is directed to the left side of Figs. 1 and 2 of the drawing, the saw and its frame is quickly moved into its operating position towards the work and away from the base and is held in this position as long as the saw continues to move towards the left. Upon the return stroke the saw is quickly returned to its inoperative position away from the work and remains in this position to complete the cycle. Figures 1 and 2 show the saw approximately at the end of its inoperative or idling stroke.

In the embodiment shown in Figs. 3 and 4 alternative means are provided for causing the transverse reciprocating movement of the saw and its frame. This modification makes use of the same base plate 1, sliding bar 2 and means for longitudinally reciprocating this bar. The cross piece of the saw frame 11a is modified by having a rack 23 formed on its inner side. A pinion 24 pivoted at 30 cooperates with the rack, this pinion being mounted at the end of a lever shown generally at 25 and shown side view in Fig. 8. The lever can be mounted directly on the base plate 1 but it is somewhat better to have it mounted directly on a separate mounting plate 26 by the pivot 27. The plate 26 has a raised portion or flange 28 which stops the lever from turning counterclockwise beyond a position wherein it is substantially at right angles to the base plate 1. It is evident from Fig. 3 that when this lever is in its right angled position it holds the saw frame outwardly away from the base plate in its sawing position. Movement of the lever into this position is brought about when the saw frame is moved to the left in Fig. 3. This tends to cause the pinion 24 to revolve but the latter is held from revolution by means of a friction brake 29 which is a piece of spring metal having substantially the shape of a triangle, mounted in a recess 32 (Fig. 8) cut in the forward end of the upper face of the lever and secured at its rear end by screws 31 which also serve to hold a cover plate 33 in position. As shown in Fig. 8 the brake 29 is mounted beneath the cover plate and its forward end is adjustably pressed against the top of pinion 24 by means of an adjusting screw 34. Sufficient friction is provided by this means to prevent the pinion from rotating as the saw frame begins its operative stroke to the left in Fig. 3 and until the lever has pivoted to its right angled position and thereby moved the saw laterally away from the base plate into contact with the work. The saw is thus held in operative position until the beginning of the return stroke of the saw. At this point the lever pivots clockwise, its pinion being held constantly against the rack by means of leaf spring 35 which is mounted in a vertical slot in pivot 27 by means of a cotter pin 36. The spring is biased against pin 37 under tension so that it tends to rotate the lever counterclockwise.

A positive pulling action is required to move the saw frame toward the base plate and away from the work at the beginning of its idling stroke. This is provided in the embodiment of Figs. 3 and 4 by a spring means shown generally at 38. This means comprises a tension spring 39 which is mounted in a housing formed of telescoping cylinders 40 and 41. The closed end 42 of cylinder 40 is welded or otherwise secured to the base plate 1 and the outer end of the spring is fastened to this end. The inner cylinder is provided at its inner end with a tongue 43 which slides within groove 44 formed in plate 69 mounted on the vertical face 70 of frame 12 as shown in the brokenaway portions of Figs. 3 and 4. The spring is secured to the tongue 43. It is thus seen that the spring 39 tends to pull the saw frame inwardly towards its inoperative position throughout the operating stroke of the saw. The spring is under tension during the operating stroke of the saw and, at the start of the return stroke, as soon as the lever 25 has pivoted clockwise to the point indicated in Fig. 3, the saw frame and saw is pulled by the spring out of its operative position. In fact the spring by its pulling action tends to pivot the lever clockwise at this point.

In Figs. 5 and 6 a different means is illustrated for moving the saw frame into and holding it in its inoperative position during the idling stroke of the saw. In this embodiment the off-set side frame 12a is provided with a rack 45 which faces and cooperates with a lever 25a which is identical in construction to lever 25 described previously. Lever 25a however is mounted in a position 180° from the position of lever 25 and its rack faces in the opposite direction. The saw frame in Fig. 5 is shown at the end of its idling stroke. At the start of the saw's operative stroke lever 25 is caused to pivot through a small angle in a counterclockwise direction as described in connection with the embodiment of Fig. 3, thereby moving the saw away from base 1 into its operating position. The lever 25a simultaneously pivots in a clockwise direction through the same angle and thereby becomes inoperative. But at the start of the idling stroke both levers rotate in the reverse direction whereby lever 25 becomes inoperative while lever 25a pulls the saw away from the work towards the base 1, due to the combined actions of the pinion 24a, its rack 45 and the brake 29a. The lever 25a remains in the position shown in Fig. 5 abutting the stop 28a throughout the idling stroke.

Instead of the rack and pinion used for operating levers 25 and 25a, these elements can be replaced, as shown in Fig. 9, by a roller 46 which rolls on the inside edge of the cross arm 11b of the saw frame. On the cross arm there is mounted a spring catch shown generally at 47, this being provided with an inner bore 48 in which a sliding latch member 49 is confined. The latter is yieldingly urged outwardly against stop 50 by spring 51. The latch is pointed at its end, this point engaging a notch 52 cut in the end of the lever 25b. The spring 51 is sufficiently strong so that, as the saw frame 11b is reciprocated to the left with respect to the lever 25b, it forces the lever to pivot counterclockwise and thereby to move the saw frame away from the base into its operative position. It is thus evident that the spring catch 47, the roller 46 and the notch 52 perform the functions of the rack and pinion and the brake of the levers 25 and 25a of the embodiments of Figs. 3 to 6. This modified means for reciprocating the saw frame transversely can be used to replace the means performing this function in the embodiments of Figs. 1 to 6, if desired.

Still another means for reciprocating the saw frame transversely is shown in Figs. 10 and 11. In this embodiment the side frame 12c of the saw frame is triangular instead of rectangular and a downwardly projecting pin 53 is mounted at the apex of the triangle. This pin is a cam follower operating in a cam groove shown generally at 54 cut in the base plate 1. The cam groove is a closed circuit as shown in the figures and is formed in two spaced parallel longitudinal tracks 55 and 56 connected at each end by curved sections 57 and 58.

In order to be certain that the cam follower pin does not merely reciprocate in one of the parallel tracks instead of following the closed circuit, snap guides in the form of metal plates are provided at both ends, shown generally at 59 and 60. These guides are provided with pivots 61 and 62 at one of their ends while at their other ends flat faces 63 and 64 are provided. Stops 65 and 66 limit the motion of the guides while leaf springs 67 and 68 tend to hold the guides in their normal positions against the stops so that their flat faces form in effect extensions of the inner faces of the spaced parallel cam tracks. In operation, as the saw frame reciprocates longitudinally with respect to the base plate, towards the end of its inoperative stroke to the right in Fig. 11 the pin 53 follows the curved section 58 of the cam track and the saw frame is thereby moved into operative position away from the base plate as the pin enters the track 56. While moving along the curved section of the track the pin pivots the snap guide 60 clockwise out of its normal position but as soon as the pin reaches the end of the curved section and enters the track 56 the guide snaps back into its normal position. This closes off the curved section of the cam track and forces the pin to move linearly along the track 56 during the operating stroke of the saw frame to the left in the figure. Towards the end of the operating stroke the pin moves guide 59 out of its normal position in the same manner and moves along the curved section 57 to enter the track 55 pulling the saw frame into its inoperative position. Thus the saw frame is caused to reciprocate both longitudinally and transversely in a manner very similar to its motions in the other embodiments which have been described.

One important feature of my saw attachment is that the saw is pressed against the work only during its operating stroke while during its idling stroke it is lifted away from the work. With this type of motion the saw dust always moves in one direction, towards the left in the figures of the drawing, and as a result there is no opportunity for the saw dust to cause binding of the saw in its cut.

While I have described what I consider to be the more advantageous embodiments of my saw attachment it is evident, of course, that various modifications can be made in the specific constructions which have been described without departing from the purview of this invention. Thus while I have found that my saw operates satisfactorily with a relatively short operating stroke of the order of one inch or even less, it is evident that the length of operating stroke can be increased readily by merely changing the crank 4 and crank arm 5 shown in Figs. 1 and 2. I have described five different modifications of means for producing transverse reciprocation of the saw and its frame but it is evident that other equivalent means can be substituted for the modifications described. My saw can be designed to operate a considerable distance from the rotary power shaft which furnishes its power merely by increasing the lengths of the crank arm, the base plate, and the lever arm. The base plate can, of course, be hinged to the tractor or mowing machine to which they are attached in manner identical to that employed in attaching the cutter bar to the conventional mowing machine. This enables my saw to make cuts at an angle to the horizontal. Other modifications of this invention which fall within the scope of the following claims will be immediately evident to those skilled in the art.

What I claim is:

1. A saw attachment adapted to be attached to and driven by a power driven machine equipped with a rotary power shaft, which comprises in combination an elongated base plate adapted to be attached to said machine, a sliding bar having a reciprocating stroke mounted for reciprocation on said base plate, means operatively attached between said sliding bar and said rotary power shaft to convert the rotary motion of said shaft to reciprocating motion and to impart said reciprocating motion to said sliding bar, spaced-parallel slide bearings mounted transversely on said sliding bar, a saw frame including a saw blade mounted in said bearings with the saw blade at one side of said sliding bar in such manner that the saw blade reciprocates longitudinally with said sliding bar while being adapted to reciprocate transversely in said slide bearings towards and away from the work to be sawed, and means operatively attached between said base plate and said saw frame to cause said transverse reciprocation; said means comprising a lever pivotally mounted on said base plate, a rotary element rotatably mounted at one end of said lever and bearing against a cooperating section of the saw frame in such manner that, when the lever is pivoted into a first position substantially perpendicular to the longitudinal axis of the saw frame, the saw and its frame are forced by pressure of the rotary element against the cooperating section of the saw frame to move in said slide bearings in a transverse direction and into sawing position, and that when said lever is pivoted into a second position at an angle to said longitudinal axis, the saw and its frame are free to move into idling position, means for causing said lever to move into said sawing position at the start of the sawing stroke of the saw frame and for holding it in said position during the sawing stroke, means for causing said lever to move into said idling position and for holding it in said position during the idling stroke of the saw and means for causing the saw and its frame to move into and be held in idling position during the idling stroke of the saw.

2. The attachment of claim 1 wherein said means for converting the rotary motion of the rotary power shaft to reciprocating motion and for imparting said motion to said sliding bar comprises a crank mounted on said power shaft and a crank arm attached between said crank and said sliding bar.

3. The attachment of claim 1 wherein said means for causing the saw and its frame to move into idling position comprises a spring attached between said base plate and said saw frame and adapted to pull the saw frame towards the base plate into idling position during its idling stroke.

4. A saw attachment adapted to be attached to and driven by a power driven machine equipped with a rotary power shaft, which comprises in combination an elongated base plate adapted to be attached to said machine, a sliding bar having a reciprocating stroke mounted for reciprocation on said base plate, means operatively attached between said sliding bar and said rotary power shaft to convert the rotary motion of said shaft to reciprocating motion and to impart said reciprocating motion to said sliding bar, spaced-parallel slide bearings mounted transversely on said sliding bar, a saw frame including a saw blade mounted in said bearings with the saw blade at one side of said sliding bar in such manner that the saw blade reciprocates longitudinally with said sliding bar while being adapted to reciprocate transversely in said slide bearings towards and away from the work to be sawed, and means operatively attached between said plate and said saw frame to cause said transverse reciprocation; said means comprising a pair of opposed spaced-parallel racks mounted on said saw frame, a pair of longitudinally spaced levers pivotally mounted on said base plate between said racks for horizontal oscillation, pinions mounted with friction bearings at the ends of said levers for cooperation with said racks, and stops mounted on said base plate to limit the oscillation of the levers; the levers, pinions, racks and stops being so constructed and arranged that as the saw frame is moved longitudinally on its operative stroke one of the levers pivots into a transverse position against its stop thereby forcing the saw frame away from the base plate into its operative position and the second lever assumes an idling position, while on the idling stroke of the saw frame the second lever pivots into a transverse position against its stop thereby pulling the saw frame towards the base plate and into its idling position and said first lever assumes an idling position.

5. A saw attachment adapted to be attached to and driven by a power driven machine equipped with a rotary power shaft, which comprises in combination an elongated base plate adapted to be attached to said machine, a sliding bar having a reciprocating stroke mounted for reciprocation on said base plate, means operatively attached between said sliding bar and said rotary power shaft to convert the rotary motion of said shaft to reciprocating motion and to impart said reciprocating motion to said sliding bar, spaced-parallel slide bearings mounted tranvesrsely on said sliding bar, a saw frame including a saw blade mounted in said bearings with the saw blade at one side of said sliding bar in such manner that the saw blade reciprocates longitudinally with said sliding bar while being adapted to reciprocate transversely in said slide bearings towards and away from the work to be sawed, and means operatively attached between said base plate and said saw frame to cause said transverse reciprocation; said means comprising a lever mounted for horizontal pivotal movement on said base plate, a stop mounted on said base plate for stopping the pivotal movement of said lever at the point where it is in a substantially transverse position with respect to said saw blade, a pin mounted on the saw frame and a cooperating slot at the end of said lever adapted to receive said pin; said lever, stop, pin and saw frame being so constructed and arranged that during the operating stroke of the saw frame the pin engages said slot causing the lever to pivot into its transverse position thereby forcing the saw frame away from the base plate into its operative position and holding it in said position during the sawing stroke while on the return stroke of the saw frame the lever is pivoted into an idling position, and means for causing the saw and its frame to move into and be held in idling position during the idling stroke of the saw when said lever is in its said idling position.

6. A saw attachment adapted to be attached to and driven by a power driven machine equipped with a rotary power shaft, which comprises in combination an elongated base plate adapted to be attached to said machine, a sliding bar having a reciprocating stroke mounted for reciprocation on said base plate, means operatively attached between said sliding bar and said rotary power shaft to convert the rotary motion of said shaft to reciprocating motion and to impart said reciprocating motion to said sliding bar, spaced-parallel slide bearings mounted transversely on said sliding bar, a saw frame including a saw blade mounted in said bearings with the saw blade at one side of said sliding bar in such manner that the saw blade reciprocates longitudinally with said sliding bar while being adapted to reciprocate transversely in said slide bearings towards and away from the work to be sawed, and means operatively attached between said base plate and said saw frame to cause said transverse reciprocation; said means comprising a lever mounted for horizontal pivotal movement on said base plate, a rack mounted on said saw frame facing said base plate, a cooperating pinion mounted with a friction bearing on one end of said lever and adapted to engage said rack, and a stop mounted on said base plate adjacent the other end of said lever adapted to stop the pivoting movement of said lever when it reaches a position substantially transverse to said base plate; said lever, rack, stop and saw frame being so constructed and arranged that during the operating stroke of the saw the lever is pivoted into transverse position thereby forcing the saw and its frame away from the base plate and into operating position while on the return stroke the lever is pivoted into an idling position, and means for causing the saw and its frame to move into and be held in idling position during the idling stroke of the saw when said lever is in its said idling position.

References Cited in the file of this patent
UNITED STATES PATENTS

| | | |
|---|---|---|
| 867,643 | Cotton | Oct. 8, 1907 |
| 1,287,947 | Ford | Dec. 17, 1918 |
| 2,175,111 | Duval | Oct. 3, 1939 |
| 2,568,791 | Cooper | Sept. 25, 1951 |